United States Patent
Pfarr et al.

(10) Patent No.: US 7,153,203 B2
(45) Date of Patent: Dec. 26, 2006

(54) APPARATUS AND METHOD FOR PORTIONING USING AUTOMATIC WORKPIECE CONVEYANCE SPEED CONTROL

(75) Inventors: Craig E. Pfarr, Issaquah, WA (US); George Blaine, Lake Stevens, WA (US)

(73) Assignee: FMC Technologies, Inc., Houston, TX (US)

( * ) Notice: Subject to any disclaimer, the term of this patent is extended or adjusted under 35 U.S.C. 154(b) by 225 days.

(21) Appl. No.: 10/895,614

(22) Filed: Jul. 21, 2004

(65) Prior Publication Data

US 2005/0032471 A1    Feb. 10, 2005

Related U.S. Application Data

(60) Provisional application No. 60/489,151, filed on Jul. 21, 2003.

(51) Int. Cl.
*A22C 17/00*  (2006.01)
*B26D 3/00*  (2006.01)

(52) U.S. Cl. .............................. 452/150; 83/72; 83/932
(58) Field of Classification Search ................ 452/150, 452/149, 136; 83/72, 76.6, 76.8, 932
See application file for complete search history.

(56) References Cited

U.S. PATENT DOCUMENTS

| | | | |
|---|---|---|---|
| 4,576,071 A * | 3/1986 | Rayment | 83/76.8 |
| 4,913,019 A | 4/1990 | Hayashi | |
| 5,163,865 A | 11/1992 | Smith | |
| 5,937,080 A * | 8/1999 | Vogeley et al. | 382/110 |
| 5,974,925 A | 11/1999 | Lindee et al. | |
| 6,164,174 A * | 12/2000 | Sigurdsson et al. | 83/13 |
| 6,520,228 B1 * | 2/2003 | Kennedy et al. | 144/398 |
| 6,539,993 B1 * | 4/2003 | Starr | 144/340 |
| 6,563,904 B1 * | 5/2003 | Wijts et al. | 378/58 |
| 6,640,682 B1 * | 11/2003 | Wagner et al. | 83/289 |
| 6,722,250 B1 * | 4/2004 | Wagner et al. | 83/880 |
| 6,826,989 B1 * | 12/2004 | Wattles et al. | 83/102 |
| 6,882,434 B1 * | 4/2005 | Sandberg et al. | 356/601 |
| 6,883,408 B1 * | 4/2005 | Shinga | 83/13 |
| 6,971,423 B1 * | 12/2005 | Starr | 144/340 |

FOREIGN PATENT DOCUMENTS

WO    WO 01/32369 A1    5/2001
WO    WO 02/07937 A3    1/2002

* cited by examiner

*Primary Examiner*—Thomas Price
(74) *Attorney, Agent, or Firm*—Christensen O'Connor Johnson Kindness pllc

(57) ABSTRACT

A portioning apparatus (10) includes a powered conveyor (12) for carrying workpieces (WP) past a scanning station (14) and past a cutting station (20). Information from the scanning station pertaining to physical parameters of the workpiece is transmitted to a control system (16) which then determines an optimal cutting strategy for the workpiece, which strategy is implemented at the cutting station (20). The length of time required to portion the workpiece is also determined, and this information is used to ascertain whether the speed of the conveyor (12) is optimal or should be changed.

28 Claims, 4 Drawing Sheets

APPARATUS AND METHOD FOR PORTIONING USING AUTOMATIC WORKPIECE CONVEYANCE SPEED CONTROL

CROSS-REFERENCE TO RELATED APPLICATION

This application is based on and claims the benefit of U.S. Provisional Application No. 60/489,151, filed Jul. 21, 2003.

FIELD OF THE INVENTION

The present invention relates to an apparatus and method for portioning and/or trimming workpieces, and more particularly to automatically adjusting the speed that workpieces are conveyed to optimize output.

BACKGROUND OF THE INVENTION

Workpieces, including food parts, are cut or otherwise portioned into smaller portions by processors in accordance with customer needs. Also, excessive fat, bone, or other foreign or undesirable materials are routinely trimmed from the food products. It is usually desirable to portion and/or trim the food products into uniform sizes or shapes, for example, for steaks to be served at restaurants or chicken filets used in frozen dinners or in chicken burgers.

The portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently cut the food product into optimum portions, trim excessive fat, remove bones, etc. The food product is then portioned or trimmed by various cutting devices, including high-speed liquid jet cutters or rotary or reciprocal blades. Once the portioning/trimming has occurred, the resulting portions are off-loaded onto a take-away conveyor for further processing, or, perhaps placed in a storage bin.

The cutters which do the portioning/trimming have a set length of time to operate since the workpiece is being carried by a continuously moving conveyor. The speed of the conveyor dictates the time in which the cutting devices have to complete the necessary portioning/trimming. If the workpiece is conveyed too fast, the portioner will not have enough time to finish the prescribed portioning/trimming operations. In the past, the conveyor belt speed has been set manually so that the conveyor operates continuously at a single/fixed speed. However, such speed may be too fast to complete the portioning/trimming operations, and thus leading to not cut workpieces as noted above, or too slow, which results in loss of production capacity. The present invention seeks to address this problem by automatically adjusting the speed of the conveyor to maximize the portioning machine's throughput while achieving an acceptable level of workpieces that are not cut.

SUMMARY OF THE INVENTION

A system for portioning workpieces includes a movable conveyor surface for supporting and advancing the workpieces. The conveyor surface is driven by a drive system capable of moving the conveyor surface at a desired speed. A scanning system scans the workpieces being carried by the conveyor surface and a cutting system portions the workpieces being carried by the conveyor surface. A control system automatically controls the speed of the conveyor surface by controlling the operation of the drive system based on the length of time required to cut the workpieces and the distance separating sequential workpieces on the conveyor surface. The control system receives data from the scanning system regarding the workpiece being scanned and receives data from the cutting system regarding the workpiece being portioned.

In accordance with the further aspect of the present invention, the control system automatically controls the speed of the conveyor surface also based on a desired selected level of successfully portioned workpieces.

In accordance with a further aspect of the present invention, the data received by the control system from the portioning system includes the actual length of time required to cut a workpiece.

In accordance with a further aspect of the present invention, the control system converts the data pertaining to the actual time required to cut the workpieces into the maximum belt speed possible for successful portioning of the workpieces, and then compiles this information into a histogram.

In accordance with a further aspect of the present invention, the data received by the control system from the scanning system comprises physical parameters of the workpiece, such physical parameters may include the shape of the workpiece, the size of the workpiece, the weight of the workpiece, the position of the workpiece along the conveyance surface and the orientation of the workpiece on the conveyance surface.

In accordance with a further aspect of the present invention, the data received by the control system from the cutting system includes data for each workpiece that is cut. Also the data received by the control system from the cutting system comprises the actual length of time required to cut each workpiece.

In accordance with a further aspect of the present invention, the determined time required to cut a workpiece is calculated based on a plurality of parameters including the size and shape of the workpiece, the strategy selected to cut the workpiece, and the performance capabilities of the portioning system.

In accordance with a further aspect of the present invention, the determined length of time required to portion a workpiece is based on at least one physical parameter of the workpiece, as ascertained by the scanning system and also through the use of a lookup table correlating such scanned physical parameter(s) with the corresponding actual time required to portion the workpiece.

The present invention also contemplates a method of portioning the workpieces while being supported on a moving support surface. The method includes scanning the workpieces while being supported on the moving support surface, portioning the workpieces while being supported on the moving support surface, determining the length of time required to portion the workpieces and automatically controlling the speed of the moving support surface based on the determined time required to carry out the portioning of workpieces and the distances separating the workpieces on the moving support surface.

The present invention further contemplates a speed control system for a portioning apparatus wherein the apparatus includes a variable speed driven conveyor for supporting and advancing workpieces, a scanning system for scanning the workpieces and a cutting system for portioning the workpieces. The conveyor speed control system determines the length of time required to portion workpieces being advanced by the conveyor and then determining an optimum speed for the conveyor based on the determined portioning time as well as on the distance between adjacent workpieces being carried by the conveyor.

In accordance with a further aspect of the present invention, the conveyor speed control system may determine the optimum speed for the conveyor also based on an acceptable tolerance level for unsuccessful completion of portioning of the workpieces.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
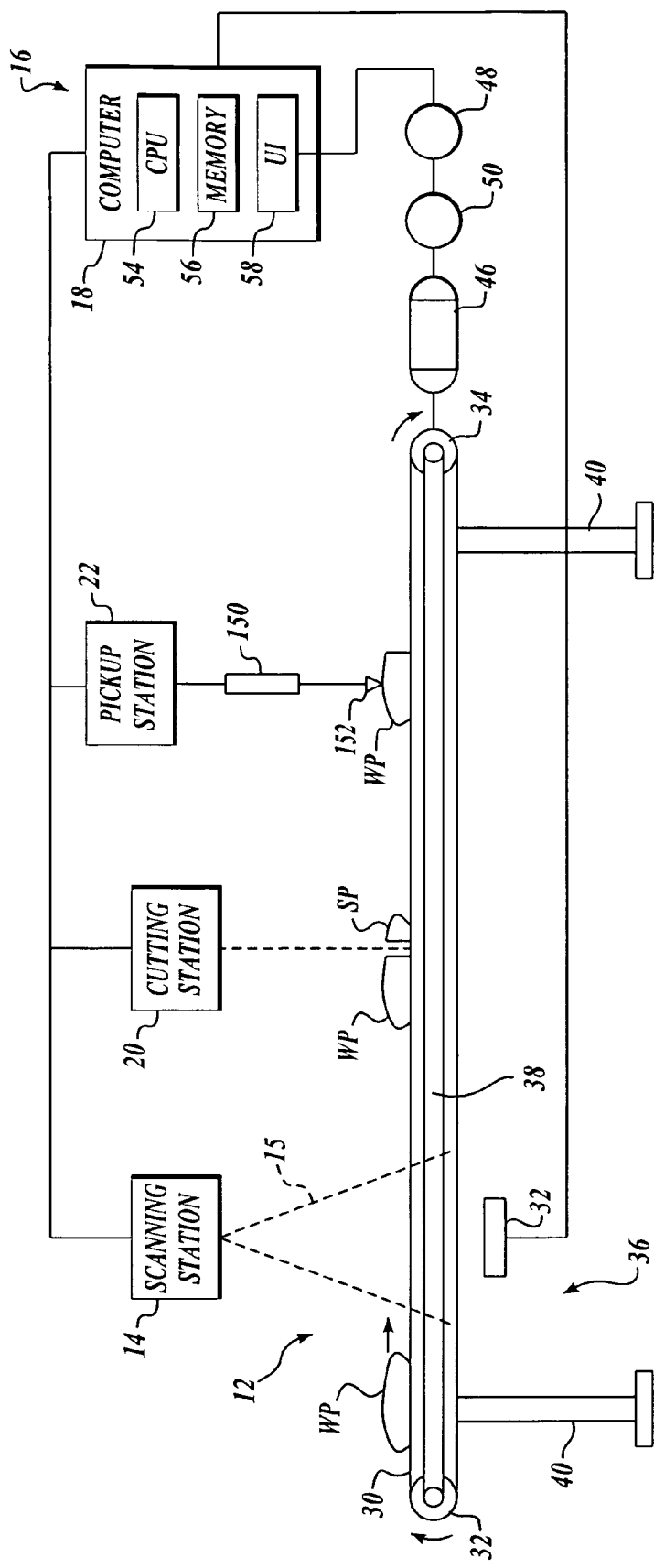
FIG. 1 is a schematic representation of an apparatus and method for automatically setting the speed of a conveyor used in a product portioning machine.

Referring initially to FIG. 1, the present invention in basic form includes a portioning apparatus 10 having a powered conveyor 12 for supporting workpieces WP to be portioned or trimmed. In the present invention the terms "upstream" and "downstream" are used with respect to the direction of movement of the conveyor 12. The conveyor 12 carries a workpiece past a scanning station 14 where the workpiece WP is scanned to ascertain selected physical parameters, for example, size and shape of the workpiece, which information can then be used to determine the weight of the workpiece, typically by utilizing an assumed density for the workpiece. Also during scanning, discontinuities (including voids), foreign material and undesirable material are located in the workpiece, for example, bones or fat in a meat portion. The information from the scanner is routed to a control system 16 consisting in part of a computer 18.

Next, the conveyor 12 carries the scanned workpiece WP to a portioning/trimming station 20, where the workpiece is portioned and/or trimmed in accordance with a cutting path that has been predetermined by the computer 18 using data from the scanning process. This data also enables the control systems to determine the anticipated time required to portion the workpiece. It is to be understood that the word "portion" or "portioned" shall also refer to "trim," "trimmed," and/or "cut." Information concerning the actual length of time required to portion the workpiece WP at cutting station 20 is transmitted to the control system 16 and stored in the computer 18. The information from the scanning process and/or the cutting process can be used to determine whether the speed of the conveyor 12 is optimal, or should be decreased to reduce the percentage of "no-cut" workpieces or increased to maximize the production rate of the portioning apparatus 10. Next, the portioned workpiece WP is carried by the conveyor 12 to a pickup station 22 for removing the portioned workpiece from the conveyor and placing the workpiece onto a take-away conveyor or other location (not shown).

Next, describing the present invention in more detail, the conveyor 12 includes an endless belt 30 that defines a conveyance surface for the workpieces. The belt 30 trained over rollers 32 and 34 which are mounted on a frame 36. Although only end rollers 32 and 34 are shown, it is to be understood that additional rollers may be employed to support the belt 30 on the frame 36. The frame 36 may be constructed in a well known manner, including with side members 38 extending lengthwise of the frame. The frame may include a bed (not shown) extending along at least part of the length of the conveyor to support the belt 30. The frame 36 is carried by leg structures 40, also in a well known manner. One or both of the rollers 32 and 34 may be powered by a variable-speed drive motor 46 coupled to a speed controller 48. The conveyor 12 also includes speed-sensing instrumentation and/or encoder 50 capable of monitoring not only the speed, but the distance traveled of belt 30. As a consequence, the location of the workpiece WP along the conveyor 12 may be monitored, as well as the speed of travel of the workpiece.

Although a singular conveyor 12 is illustrated in FIG. 1, it is to be understood that conveyor 12 may be replaced with two or more conveyors. Not uncommonly, a separate infeed conveyor may be used on which workpieces WP are loaded and then carried to a location downstream of the scanning station 14, whereupon the workpiece is transferred to a second conveyor that carries and supports the workpiece past the cutting station 20. One of the reasons for using two separate conveyors is that the belt used for the infeed conveyor may be composed of a non-metallic material thereby being compatible with the type of scanning system utilized, for instance, x-rays. The composition of the second conveyor is typically dependent on the type of cutting apparatus used at cutting station 20. For example, if a high-speed fluid jet is used for portioning/cutting the workpiece WP, then a metallic belt of a grid or "open" construction is utilized to allow the fluid jet to pass downwardly through the belt, for example, after the jet passes through the workpiece being cut. If separate infeed and cutter belts are utilized, then the present invention is capable of controlling the speed of both conveyors so as to optimize the operation of the portioning apparatus 10.

As an alternative to the "solid" or sheet construction of the infeed belt and/or the grid construction of the cutter belt, the belt 30 (conveyance surface) can be composed of a series of parallel lines or wires moving in unison. An example of such a conveyance belt is disclosed in U.S. Pat. No. 6,315,100, incorporated herein by reference.

As noted above, the workpieces WP are carried by conveyor 12 to a scanning station 14 whereat the workpieces are scanned to ascertain certain selected physical parameters pertaining to the workpiece, including, for example, the two- or three-dimensional shape of the workpiece and the size or volume of the workpiece. With an assumed density for the workpiece, the weight of the workpiece can be calculated. Information from the scanning station is used to control the cutter station 20, the pickup station 22 as well as the speed of conveyor 12. Also, at the scanning station it is possible to locate voids and foreign material in the workpiece as well as bones or fat in meat products. The location of the workpiece WP relative to the belt 30 also may be ascertained by the scanning station. With this information, the distance separating sequential workpieces can be determined.

The scanning can be carried out utilizing a variety of techniques, including a video camera to view a workpiece illuminated by one or more light sources. Light from the light source is extended across the moving conveyor to define a sharp shadow or light stripe line, with the area forward of the transverse beam being dark. When no workpiece is being carried by the conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece were present on the conveyor. This displacement represents the thickness of the workpiece along the shadow line/light stripe. The length of the workpiece is determined by the length of time that shadow lines are created by the workpiece. In this regard, an encoder may be integrated into the conveyor structure, with the encoder generating pulses at fixed time intervals corresponding to the forward movement of the conveyor.

In lieu of a video camera, the scanning stations may instead utilize an x-ray apparatus for determining the physical characteristics of the workpiece, including its shape, mass, and weight. X-rays may be passed through the object in the direction of an x-ray detector 60. Such x-rays are attenuated by the workpiece in proportion to the mass thereof. The x-ray detector 52 is capable of measuring the intensity of x-rays received thereby after passing through the workpiece. This information is utilized to determine the overall shape and size of the workpiece, as well as the mass thereof. An example of such an x-ray scanning device is disclosed by U.S. Pat. No. 5,585,603, incorporated by reference herein in its entirety.

The data/information measured/gathered by the scanning devices is transmitted to the computing control system 16, which records the location of the workpiece on the conveyor as well as the shape and other parameters of the workpiece. With this information, along with previously gained information, the computer 18 determines how to optimally portion the workpiece at the portioning station 22. As discussed more fully below, once the cut path has been determined, the computer also can calculate the anticipated length of time that is needed to portion the workpiece, taking into account other factors, such as the performance characteristics of the portioning station.

The control system 16 may include a computer 18 composed of a central processing unit 54, at least one memory 56, and a user interface (UI) 58. The user interface 58 may include, for example, a keyboard or other type of control panel as well as a monitor or display and a printer. Collectively these devices receive, process, and store information from the scanning station 14 as well as from the cutting station 20, as discussed more fully below.

The computer, along with other components of the control system 16, controls the operation of the conveyor 12, the scanning station 14, the cutting station 20 as well as the pickup device 22, as discussed more fully below. As will be apparent to those skilled in the art, any processing or controlling operation may be performed by a single computer, such as computer 18, or by a plurality of network computers in a distributed manner. Accordingly, the term "computer 18" is used herein to cover various arrangements of one or more computers.

From the scanning station 14, the conveyor 12 advances the workpiece WP to cutting station 20. By the time the workpiece has reached this location, the computer 18, receiving data from the scanning station 14, has determined how to optimally portion or trim the workpiece at the cutting station, and the anticipated time required to complete such portioning or trimming.

The portioning may be carried out by various types of cutting devices including high-pressure water jets as disclosed in U.S. Pat. Nos. 4,875,254, 5,365,186 and 5,868,056. Other types of cutting devices may be utilized, including band saws, reciprocating saws, circular saws, guillotine knives, and lasers. Workpieces can be portioned in accordance with desired portion sizes, portion weights, portion shapes, portion thickness, maximum fat content or other parameters. Workpieces can be trimmed to remove excess fat or excess bones or foreign matter.

Figure 4:
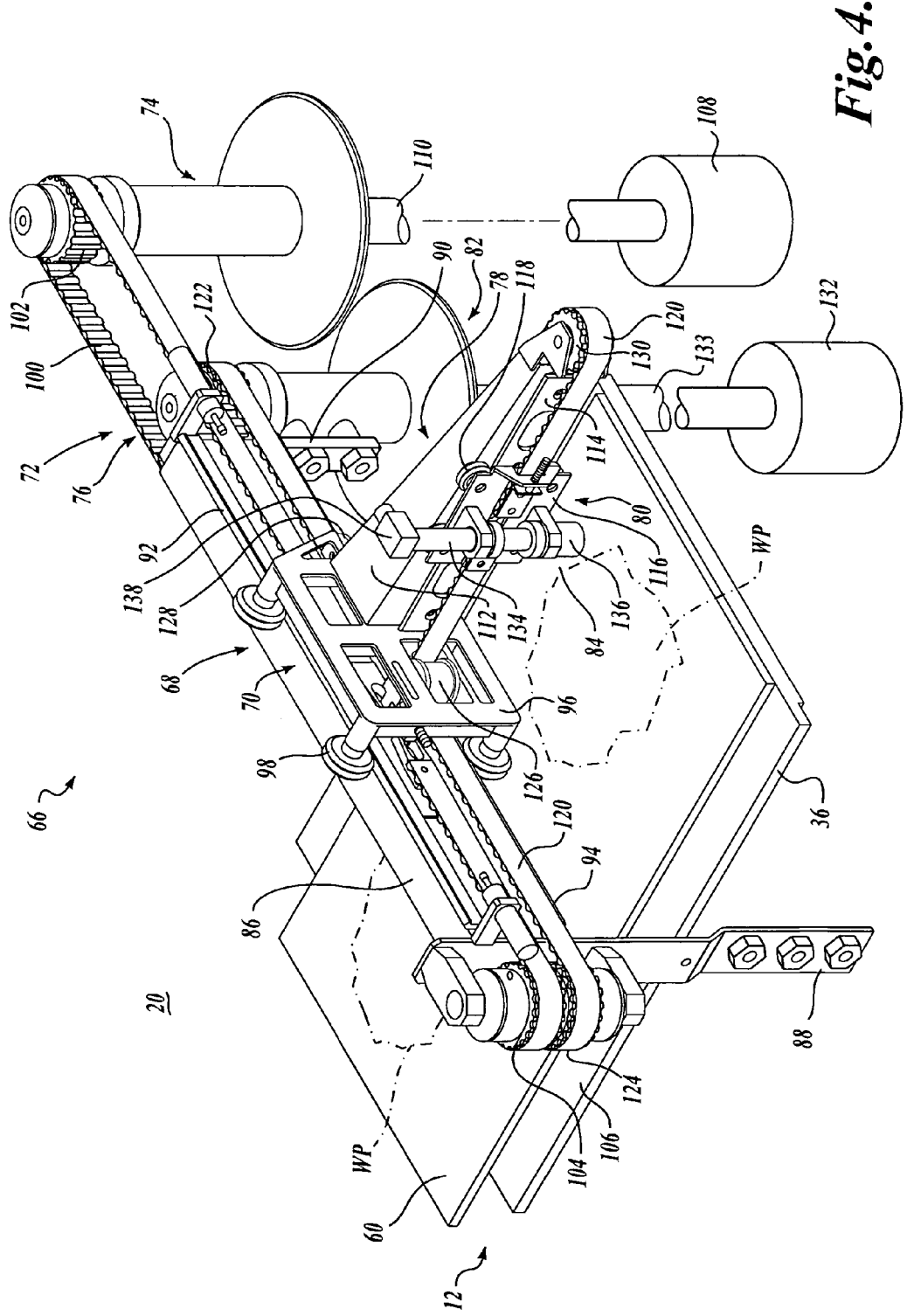
FIG. 4 is a schematic view of a high-speed water jet nozzle and a carriage therefore used in the apparatus and method of the present invention.

FIG. 4 illustrates one particular cutting apparatus 66 located at station 20 that may be utilized in conjunction with the present invention. The apparatus 66 in basic form includes a support structure 68 extending across the conveyor 12 for supporting and guiding a carriage 70 for movement transversely to the direction of movement of the conveyor. The carriage 70 is powered by a drive system 72 including in part, a motive system 74 and a drive train 76. A second, longitudinal support structure 78 is cantilevered outwardly from carriage 70 in a direction generally aligned with a direction of movement of the conveyor 12. A second longitudinal carriage 80 is adapted to move along longitudinal support structure 78 by the drive system 72. In this regard, a second motive system 82 powers the longitudinal carriage 80 through the drive train 76. A high-speed water jet nozzle 84 is mounted on the longitudinal carriage 80 to move therewith as the nozzle operates on (cuts) the underlying workpiece WP being carried by the conveyor 12.

As shown in FIG. 4, the support structure 68 includes a beam structure 86 that extends transversely across the conveyor 12 at an elevation spaced above belt 60. The ends of the beam 44 may be supported by brackets 88 and 90 extending upwardly from the conveyor frame 36. The support structure 60 also includes a track for guiding the carriage 70 along beam structure 86, composed of an upper rail 92 and a lower rail 94 attached to face of beam structure 86 facing the carriage. The carriage 70 includes a generally rectangularly shaped bed portion 96 with rollers 98 attached to the corners of the bed portion.

The carriage 70 is powered to move back and forth along beam structure 86 by motive system 74. In this regard, a timing belt 100 extends around a drive pulley 102 located at the upper end of motive system 74, and also around an idler pulley 104 of an idler assembly 106 mounted on the upper end of bracket 88. The belt 100 makes a loop around beam structure 86, extending closely along the side walls of the beam, with the ends of the belt connected to the back side of carriage bed 96.

The motive system 74 includes a servomotor 108 controllable by computer 18 to move the carriage 70 back and forth along beam structure 86 as desired. A drive shaft 110 extends up from the servo motor 108 to power the drive pulley 102. As further shown in FIG. 4, the longitudinal support structure 78 cantilevers transversely from carriage 70 to be carried by the carriage. The support structure 78 includes a beam member 112 that tapers in the direction of its distal end. An elongate track 114 extends along the side of the beam member 112 for guiding the longitudinal carriage 80. The carriage 80 includes a substantially planar, rectangularly shaped bed portion 116 and rollers 118 at each of its corners adapted to ride along the upper and lower edges of track 114.

Carriage 80 is moved back and forth along track 114 by drive system 72. In this regard, the drive system includes a second motive system 82, constructed similarly to motive system 74, to power a timing belt 120 which is trained around a drive pulley 122 mounted on the upper end of motive system 82 and also trained around an idler pulley 124, which is located below idler pulley 104. The belt 120 also trains around idler pulleys 126 and 128 mounted on carriage 70. A further idler pulley 130 is mounted on the distal end of beam 112. The ends of the belt 120 are attached to the bed 116 of carriage 80 so that rotation of the drive pulley 122 results in movement of the belt 120 which in turn causes transverse carriage 80 to move along track 114. As with motive system 74, ideally, motive system 82 includes a servo motor 132, which is drivingly engaged with drive pulley 122 by a drive shaft 133.

A cutting tool in the form of a high-pressure liquid nozzle assembly 84 is mounted on the longitudinal carriage 80 to move therewith. The nozzle assembly includes a body portion 134 that is secured to the carriage bed 116. The nozzle assembly 84 also includes a lower outlet tip 136 directed downwardly towards conveyor belt 60. An entrance elbow 138 is attached to the upper end of the nozzle body 134. High-pressure liquid nozzles of the type of nozzle assembly 84 are articles of commerce. High-pressure water is supplied to nozzle assembly 84 by supply lines, not shown, in a manner well-known in the art.

In operation, as workpieces WP are carried along conveyor 12, the nozzle assembly 84 is moved along selected paths of travel by carriages 70 and 80 powered by drive system 72. Carriage 70 moves the nozzle assembly 84 transversely, and carriage 80 moves the nozzle longitudinally relative to the direction of travel of the conveyor 12. This enables the nozzle to travel quickly along complicated routes which are programmed into the operation of the servo motors of the motive systems 74 and 82 by computer 42. Nonetheless, the travel of carriage 80 along track 114 is of limited length. Thus, if the belt 30 is traveling at too high of a rate of speed, it may not be possible for the nozzle assembly 84 to complete the portioning or trimming of workpiece WP before the next workpiece has arrived at the cutting station 20. On the other hand, if the speed of the belt 30 is too slow, the nozzle assembly 84, having completed the portioning or trimming of a workpiece WP, must remain idle, in standby mode, waiting for the next workpiece WP to arrive at the cutting station 20.

The present invention may utilize data collected at the cutting station 20 as well as data collected at the scanning station 14 to seek to optimize the speed of the conveyor 12 so as to maximize production rate from the portioning apparatus 10 while staying within a level of acceptable "no-cut" workpieces. In this regard, the control system 16 calculates fairly precisely the determined cutting time required for each workpiece, then converts this into how fast the conveyor could be operated and still successfully portion the workpiece. This information is used to control the speed of conveyor 12. The data from each workpiece portioned at cutting station 20 is collected and stored in memory 56 of computer 16. This data is compiled into a histogram of the last "n" number of workpieces cut by the CPU 54 using statistical analysis. Generally the number "n" can be about 125. A smaller or larger number of workpieces can be utilized, for example, from about 100 to 150, as long as the number used is statistically significant.

The control system 16 can determine the belt speed that will result in an acceptable level of "no-cut" workpieces. Typically, such level of "no-cut" workpieces is in the range of 0 to 5%. The control system 16 is thereby capable of automatically adjusting the speed of belt 30 to match the historical data collected from cutting station 20 and compiled by the computer 18. The "no-cuts" can be due to various reasons, for example, due to the workpiece being too large to be cut within the time required or due to two workpieces overlapping so as to effectively create a relatively large workpiece that cannot be portioned within the allotted time, or due to too much trimming required of the workpiece such that the trimming cannot be completed within the allotted time.

It will be appreciated that, by using the data from the cutting station, the optimal speed of conveyor 12 determined by control system 16 is based on historical data and not based on the actual workpiece being portioned or cut at a particular time. This is usually satisfactory in that although the present invention is capable of calculating an immediate optimum speed for conveyor 12 and is capable of changing the speed of the conveyor for each workpiece, generally this is not likely to be utilized since the portioning apparatus 10 needs to be operated at a reasonably stable speed to synchronize with the rest of the process line, of which the portioning apparatus 10 forms a part.

As noted above, it is also possible to optimize the speed of conveyor 12 from information obtained from scanning station 14. This information is used by the control system to determine the anticipated cutting time required for each workpiece based on the size and other parameters of the workpiece and the cutting strategy and/or path selected by the control system for the workpiece being scanned. In this regard, the anticipated time required to complete the portioning of a workpiece can be computed based on the number and location of the required cuts, the thickness, size and other physical parameters of the workpiece, the speed and other performance capabilities of portioning apparatus 66 as well as other data and factors. The thus-determined anticipated cutting time can be adjusted by the actual measured cutting time to portion or trim the workpiece in question as subsequently measured at the portioning station. This information can be used or factored into the formulae and/or algorithms used to calculate the determined cut time. It will be appreciated that by using the anticipated cutting time determined from the scanning process, it is possible to optimize the speed of the conveyor 12 for each individual workpiece WP.

In addition, or as an alternative, a lookup table can be generated for the actual cutting time required for a workpiece based on a limited number of parameters, for example, the overall size and weight of the workpiece. Data can be retained by computer 18 which correlates the actual time required to portion the workpiece for given parameter values. In this manner, the determined length of time required to portion or trim the workpiece is known before the workpiece reaches the cutting station 20 by measuring/determining a minimum of physical parameters of the workpiece at the scanning station 14.

In addition, the foregoing anticipated cut time determined from the scan information can be matched against the actual time required to portion/trim such workpiece thereby to serve as a check on whether portioning of the workpiece has likely been correctly carried out. If there is a large deviation between the determined anticipated cut time and the determined actual measured cut time, an error or alarm signal can be generated and the affected workpiece could be automatically removed from the conveyor 12 and placed in a specific location for evaluation or examination at a later time. It will be appreciated that such monitoring of an error in portioning or cutting can also be carried out by monitoring if the actual time required to cut a workpiece is a significant departure from the expected cut time based on the actual cut times required for past workpieces, described above.

Once the workpiece WP has been portioned or trimmed, it may be removed from the conveyor 12 at pickup station 22. At station 22 one or more pickup devices 150 are controlled by control system 16 for removing the portion/cut workpieces from conveyor 12 for placement on a take-away conveyor (not shown) or other location. The pickup device 150 may be automatically operated by the control system. In this regard, the control system 16 tracks the location of the workpiece on the conveyor 12, and uses this known location to control the operation of pickup devices 150 to automatically remove the workpiece from the conveyor. The pickup device 150 may include an attachable portion 152 capable of secure attachment with the workpiece so as to lift the workpiece from the belt 30 and carry the workpiece laterally relative to the direction of movement of the conveyor 12 to a take-away conveyor or other location. A particular pickup device suitable for use in conjunction with the present invention is disclosed in copending U.S. patent application Ser. No. 09/619,423, filed Jul. 19, 2002, and commonly assigned, which is explicitly incorporated herein. In one embodiment, the attachable portion 152 of the pickup device 150 utilizes suction action to grasp a portioned/trimmed workpiece WP.

It will be appreciated that workpieces that have been portioned may be removed from conveyor 12 by other methods in addition to using pickup devices 150. For example, an arm (not shown) can be used to push or sweep the workpieces from the belt 30, or a powered ram can be employed to push or sweep the workpieces from the conveyor. As a further alternative, the workpieces may be allowed to simply fall off of the end of the conveyor 30 onto another conveyor, a collection container, etc. Thus, the present invention is not intended to limit the disposition of the workpieces after being portioned.

Figure 2:
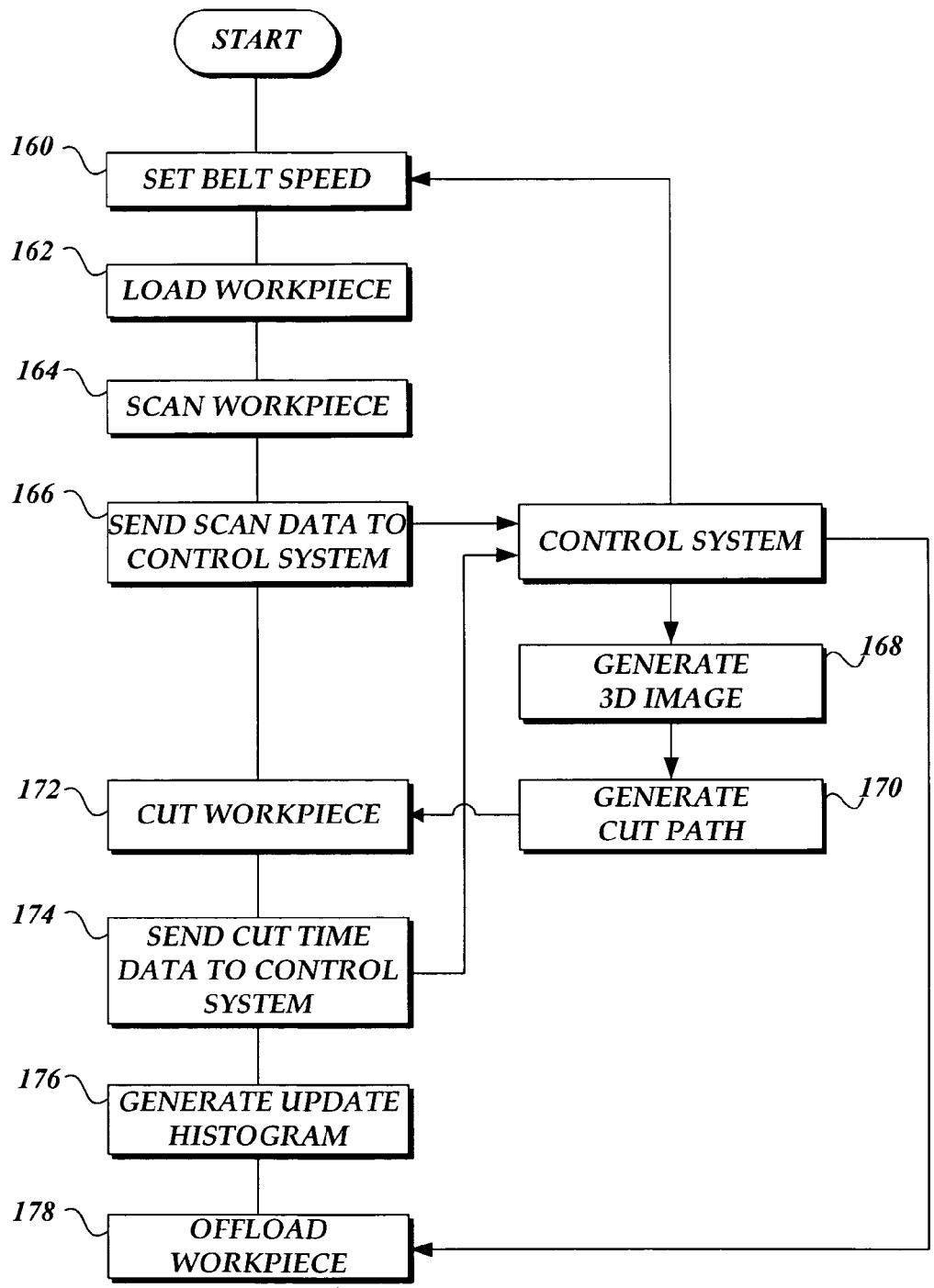
FIG. 2 is a flow chart of the portioning method of the present invention.

In accordance with the method of the present invention, referring to FIG. 2, the control system 16 initially sets the speed of belt 30 at step 160. This initial belt speed can be based on the operational history of the portioning apparatus 10 for similar workpieces that have been portioned in a similar manner. This avoids having to rely on an initial speed set by an operator based on some long-standing "average" speed. Rather, a more precise speed can be initially selected based on accumulated actual cut time data that has been analyzed and retained by the control system 16.

Next, at step 162, the workpieces WP are loaded onto conveyor 12. Such loading may be carried out either manually or through the use of an automatic or semi-automatic load system, not shown. Thereafter, the workpieces are carried by the conveyor to scanning station 14 at step 164. Here, the workpiece is scanned to measure/determine the size and shape and/or other physical parameters of the workpiece as well as the position/location of the workpiece on the belt 30. The information from the scanning step 164 is sent to the control system 16 at step 166. With this scanning information, the control system 16 is capable of determining other physical characteristics of the workpiece, for instance, its weight, as well as whether or not the workpiece has discontinuities or other undesirable materials that need to be trimmed from the workpiece. The control system also is capable of generating a three-dimensional image of the workpiece, for example, at step 168. With this information, the control system determines how to portion the workpiece based on preset parameters, such as an acceptable shape of the workpiece or an acceptable weight range of the workpiece, etc. This constitutes step 170, shown in FIG. 2.

Next, the workpiece is portioned at step 172 using the information from the scanning step 164 as processed by the control system 16. After the portioning has been completed, the time required to carry out such portioning is sent to the control system. The control system converts this into the maximum allowable belt speed that would still result in the successful portioning of the workpiece and then accumulates this information into a histogram of the last selected number of workpieces that have been portioned. Such selected number of actual belt speeds for successfully portioning workpieces is sufficiently large to be statistically relevant, thereby to enable trends and deviations to be determined. The portion time data is used to update the histogram of the control system at step 176. Also using the updated information, the control system determines whether or not the belt speed should be altered based on the portion time information. Of course, rather than building the histogram from maximum belt speeds, the histogram could be composed of measured portioning times. However, this data would then have to be converted to corresponding belt speeds in order to actually adjust the speed of the conveyor 12.

Lastly, the workpiece is offloaded from the conveyor 12 at step 178. The foregoing process is then repeated with the next workpiece.

Figure 3:
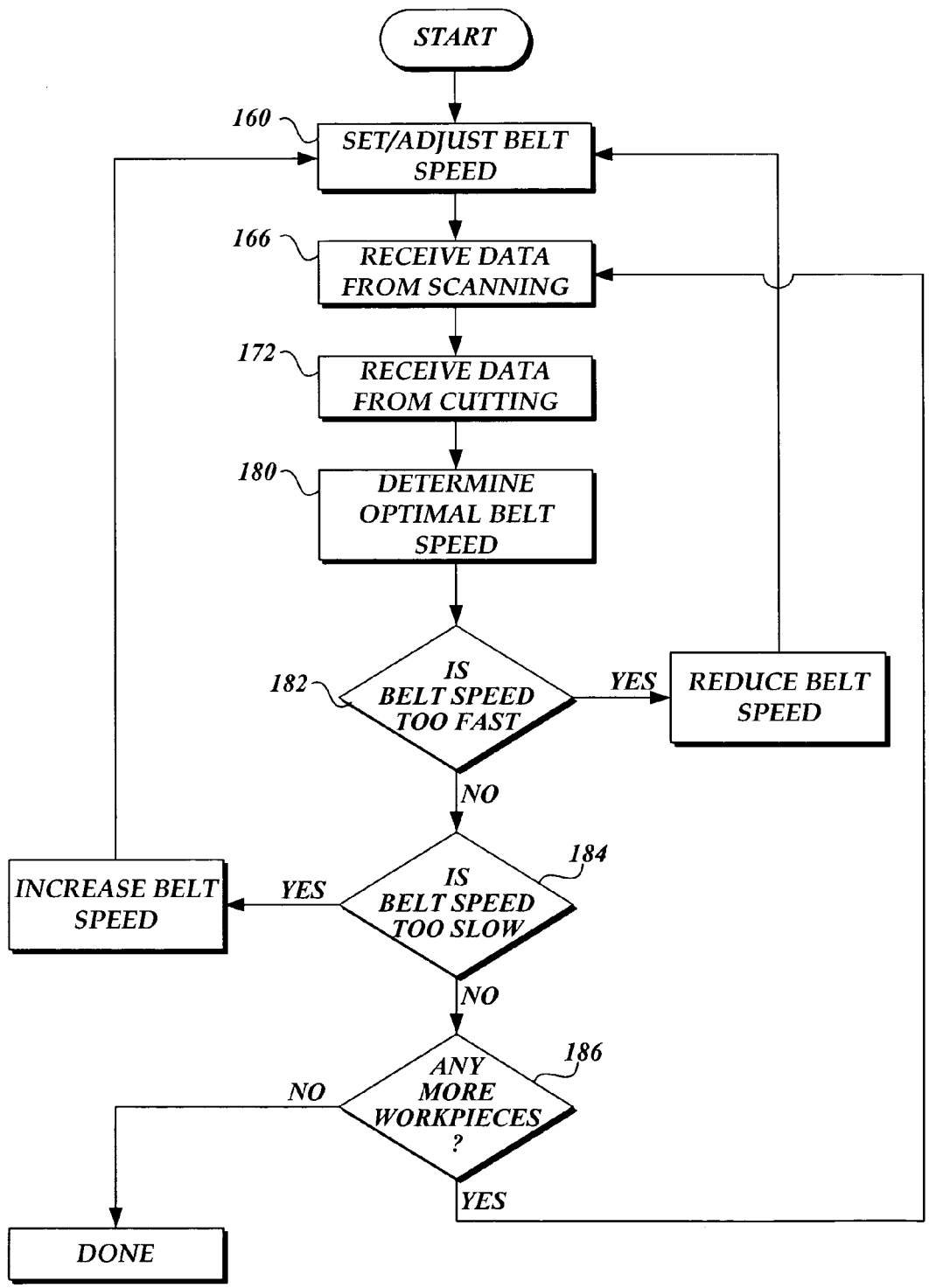
FIG. 3 is a flow chart of a computer program for automatically controlling the speed of the conveyor of a portioning system of the present invention.

The operation of the computer program used by control system 16 to set and control the speed of conveyor 12 is illustrated schematically in FIG. 3. As noted previously, the first step 160 is to set the initial speed of the conveyor 12. Next, at step 166, the information from the scanning step 164 is received by the computer 18. Thereafter, the information from the cutting step 172 is received by the computer 18. With this information, the computer determines the optimal speed of the conveyor 12 at step 180. As described above, this determination is made by referring to a histogram consisting of the actual maximum speed that the belt could be operated at and still successfully portion a fixed number of workpieces at cutting station 20. Also factored into the determination of optimal conveyor speed is the percentage of workpieces that are neither portioned/trimmed or are incompletely portioned/trimmed. This determination can be made using statistical analysis of the information in the histogram. It is possible to set the conveyor speed slow enough so that all workpieces are completely and properly portioned/trimmed, but typically this is not the cutting strategy chosen because to achieve a 0 percentage of "no-cut" rejects, the conveyor likely would have to operate at a slower speed so causing the portioning apparatus 66 to remain idle for at least some proportion of the time. Thus, typically, processing apparatus operators will set the speed of the conveyor 12 to tolerate a certain percentage of "no-cut" workpieces to be allowed, though not likely often above about 5%.

Next, the control system determines at step 182 whether the current speed of the conveyor 12 is too fast based on the calculated optimum speed. If this is the case, the control system automatically sends a signal to the speed controller 48 of the conveyor drive motor 46 to appropriately reduce the speed of the conveyor 12.

On the other hand, if the speed of the conveyor 12 is not too fast, then the control system determines whether the speed of the conveyor is too slow at step 184. If this is the case, the control system sends an appropriate signal to the speed controller 48 to speed up the operation of the drive motor 46. Generally, unless overridden, the control system will only allow the conveyor to reduce in speed or speed up by a maximum amount per monitored workpiece or per unit time, thereby avoiding significant swings in speed of the conveyor 12 and also smoothing out the effects of aberrations that might occur in the measured actual cut time for a workpiece. Alternatively, if the actual allowable maximum belt speed is significantly longer or shorter than the average of the allowable belt speeds in the histogram generated by the computer, then such aberrational belt speed may perhaps not be added to the histogram, unless of course the next several workpieces correspond to a similar maximum belt speed.

The belt speed control program next, at step 186, determines whether any more workpieces are scanned at scanning station 14, and if not, the conveyor is allowed to continue to operate at its last current speed or the conveyor perhaps is shut down. On the other hand, if additional workpieces are being scanned at station 14, the foregoing process is repeated beginning at step 166 pertaining to receiving information from the scanning station.

In addition to optimizing the speed of conveyor 12 to achieve a desired maximum percentage of "no-cut" workpieces while also maximizing the output of portioning apparatus 10, the present invention can also be used to control the speed of the conveyor for other purposes, for instance, to train new personnel that load workpieces onto the conveyor 12. For this purpose, the speed of the conveyor 12 can be set at less than maximum, for example, at a speed 20% slower than maximum. This enables the new personnel to gain experience in loading the conveyor 12. Thereafter, at the end of a set learning time, for example a half hour or an hour, the speed of the belt 12 can be incrementally increased, for instance by 1% every five minutes, until up to full speed. The same strategy can be used at the beginning of a work day to assist in transitioning the personnel from a belt speed less than maximum to a maximum belt speed.

As discussed above with respect to FIG. 3, the determination of the optimum belt speed by the control system 16 utilizes historical information based on actual portioning times of previously portioned/cut workpieces. However, as also noted above, the determined anticipated cut time for a workpiece can be calculated ahead of time based on information received from the scanning step 164. The control system may utilize information from the scanning step to compute an estimated cut/portion time for a workpiece based on several or numerous criteria, including, for example, the shape of the workpiece scanned at station 164, the overall volume of the workpiece, the weight of the workpiece, the shape and size of the desired workpiece after portioning, the particular undesirable material that is needed to be trimmed from the workpiece, as well as the performance characteristics of the portioning apparatus 66. With this information, the control system 10 calculates with considerable accuracy the anticipated time required to portion/trim the workpiece before portioning/trimming actually occurs. Moreover, with such information considered together with the acceptable level of "no-cut" workpieces, the control system can adjust the speed of the conveyor 12. This information can be used to determine the maximum allowable belt speed, which information in turn is used to populate the histogram.

Moreover, after the workpiece has been portioned, the actual time required to portion the workpiece can be compared with the time that had been calculated by the control system. If a deviation occurs therebetween, the histogram containing the maximum allowable belt speeds can be adjusted based on the actual measured portion time.

As also noted above, as a further alternative, the anticipated cut time for a workpiece can be calculated after scanning of the workpiece has been completed at step 164 by focusing on a limited number of parameters measured or determined by virtue of the scanning step. With such factor or factors, the control system can refer to a lookup table that indicates historically how long it has taken to portion/trim the workpiece having the same ascertained factor(s) or characteristic(s). In this manner, the determination of the anticipated time required to portion the workpiece can be made with fewer computations and at a faster rate than if a lookup table were not used and rather a more complicated or sophisticated computational method were employed. As noted above, once the actual portioning time for a workpiece is measured, the lookup table can be updated to reflect such actual portioning times.

Regardless of which of the above techniques is used to arrive at the determined cut time, by collecting the actual cut time required for each workpiece WP, the present invention is capable of providing valuable statistical data for each "set-up". Thus, particular portioning strategies can be selected that are more efficient than others. This may include something as straightforward as how a particular workpiece is oriented on the conveyor 12, or the manner in which the workpieces are loaded onto the conveyor and the relative spacing of the workpieces on the conveyor.

While embodiments of the invention have been illustrated and described, it will be appreciated that various changes can be made therein without departing from the spirit and scope of the invention.

The embodiments of the invention in which an exclusive property or privilege is claimed are defined as follows:

1. A portioning system, comprising:
   a movable conveyance surface for supporting and advancing workpieces to be portioned;
   a drive system for driving the conveyance surface, said drive system capable of moving the conveyance surface at a desired speed;
   a scanning system for scanning the workpieces being carried by the conveyance surface;
   a cutting system for portioning the workpieces being carried by the conveyance surface;
   a control system for automatically controlling the speed of the conveyance surface by controlling the operation of the drive system based on a determined length of time to cut the workpiece, which in turn is based on data from at least one of the scanning system regarding the workpiece being scanned and the cutting systems regarding the workpiece being cut.

2. The portioning system according to claim 1, wherein the data received by the control system from the cutting system includes the actual length of time required to cut the workpiece.

3. The portioning system according to claim 2, wherein the data received from the cutting system further comprises the distance separating sequential workpieces on the conveying surface.

4. The portioning system according to claim 3, wherein the control system converts the data pertaining to the actual time required to cut the workpieces into the maximum belt speed possible for successful portioning of the workpieces and then compiles this information into a histogram.

5. The portioning system according to claim 4, wherein the determined maximum belt speed to successfully cut a workpiece is based on the data contained in the histogram.

6. The portioning system according to claim 2, wherein data is received by the control system from the cutting system for each workpiece that is cut.

7. The portioning subsystem according to claim 6, wherein the data received by the control system from the cutting system comprises the actual length of time required to cut each workpiece.

8. The portioning system according to claim 1, wherein the data received by the control system from the scanning system comprises physical parameters of the workpiece.

9. The portioning system according to claim 8, wherein the physical parameters of the workpiece received by the control system includes parameters selected from the group consisting of the shape of the workpiece, the size of the workpiece, the weight of the workpiece, the position of the workpiece along the conveyance surface and the orientation of the workpiece on the conveyance surface.

10. The portioning system according to claim 8, wherein the data received by the control system from the scanning system further comprises the distance separating sequential workpieces on the conveying surface.

11. The portioning system according to claim 9, wherein the calculated length of time to cut a workpiece is adjustable by the measured actual time required to cut such workpiece.

12. The portioning system according to claim 1, wherein the control system converts the determined length of time to cut the workpieces into the maximum belt speed possible for successfully portioning the workpieces, and then compiling this information into a histogram.

13. The portioning system according to claim 12, wherein the determined maximum belt speed to successfully cut a workpiece is based on data contained in the histogram.

14. The portioning system according to claim 1, wherein the determined length of time required to portion a workpiece is based on at least one physical parameter of the workpiece, as ascertained by the scanning system and a lookup table correlating such scanned at least one physical parameter with a corresponding actual time required to portion the workpiece.

15. The portioning system according to claim 14, wherein the at least one physical parameter of the workpiece is selected from the group consisting of the weight of the workpiece, the volume of the workpiece, and the shape of the workpiece.

16. The portioning system according to claim 1, wherein the control system for automatically controlling the speed of the conveyance surface by controlling the operation of the drive system is also based on a selected level of successfully portioned workpieces.

17. The portioning system according to claim 1, wherein the controlled speed of the conveyance surface is also based on a tolerance level for the unsuccessful completion of the portioning of the workpieces.

18. The portioning system according to claim 1, wherein the determined length of time required to portion the workpieces is calculated based on a plurality of parameters selected from a group consisting of the size of the workpiece, the shape of the workpiece, the strategy selected to portion the workpiece, and the performance capabilities of the cutting system.

19. A conveyor speed control system for a portioning apparatus having a conveyor driven by a variable-speed drive system for supporting and advancing workpieces to be portioned, a scanning system for scanning workpieces being carried by the conveyor, and a cutting system for portioning the workpieces being carried by the conveyor, said conveyor speed control system comprising determining the length of time required to portion workpieces being advanced by the conveyor, and determining an optimum speed for the conveyor based on the determined time required for portioning the workpieces, and the distance between adjacent workpieces being carried by the conveyor.

20. The control system according to claim 19, wherein determining the optimum speed for the conveyor is also based on a tolerance level for the unsuccessful completion of the portioning of the workpieces.

21. The control system according to claim 19, wherein the determined time for portioning workpieces is based on the actual time required to portion prior workpieces.

22. The control system according to claim 21, wherein the actual time required to portion previous workpieces is converted into the maximum belt speed permissible while still successfully portioning the workpieces and then arranging such maximum belt speeds in a histogram.

23. The control system according to claim 19, wherein the determined length of time required to portion the workpieces is calculated based on a plurality of parameters selected from a group consisting of the size of the workpiece, the shape of the workpiece, a strategy selected to portion the workpiece, and the performance capabilities of the cutting system.

24. A portioning system, comprising:
a movable conveyance surface for supporting and advancing workpieces to be portioned;
a drive system for driving the conveyance surface, said drive system capable of moving the conveyance surface at a desired speed;
a cutting system for portioning the workpieces being carried by the conveyance surface;
a control system for automatically controlling the speed of the conveyance surface by controlling the operation of the drive system based on a determined length of time to portion the workpiece and the distance between adjacent workpiece being carried by the conveyance surface.

25. The portioning system according to claim 24, wherein determining the controlled speed of the conveyance surface is also based on a tolerance level for the unsuccessful completion of the portioning of the workpieces.

26. The portioning system according to claim 24, wherein the determined time for portioning workpieces is based on the actual time required to portion prior workpieces.

27. The portioning system according to claim 26, wherein the actual time required to portion previous workpieces is converted into the maximum conveyance surface speed permissible while still successfully portioning the workpieces and then arranging such maximum conveyance surface speeds in a histogram.

28. The portioning system according to claim 24:
further comprising scanning the workpieces being carried by the conveyance surface; and
wherein the determined length of time required to portion the workpieces is calculated based on a plurality of parameters selected from a group consisting of the scanned size of the workpiece, the scanned shape of the workpiece, a strategy selected to portion the workpiece, and the performance capabilities of the cutting system.

* * * * *

UNITED STATES PATENT AND TRADEMARK OFFICE
CERTIFICATE OF CORRECTION

PATENT NO. : 7,153,203 B2
APPLICATION NO. : 10/895614
DATED : December 26, 2006
INVENTOR(S) : C. E. Pfarr et al.

It is certified that error appears in the above-identified patent and that said Letters Patent is hereby corrected as shown below:

| COLUMN | LINE | ERROR |
| --- | --- | --- |
| 6 | 44 | "comers" should read --corners-- |
| 12 | 53 | "cuffing" should read --cutting-- |
| 12 | 57 | "cuffing" should read --cutting-- |
| 14 | 39 | "workpiece" should read --workpieces-- |

Signed and Sealed this
Nineteenth Day of April, 2011

David J. Kappos
*Director of the United States Patent and Trademark Office*